United States Patent
Kim et al.

(10) Patent No.: US 11,908,200 B2
(45) Date of Patent: Feb. 20, 2024

(54) SYSTEM AND METHOD IN THE PREDICTION OF TARGET VEHICLE BEHAVIOR BASED ON IMAGE FRAME AND NORMALIZATION

(71) Applicant: Canoo Technologies Inc., Torrance, CA (US)

(72) Inventors: Kilsoo Kim, Hermosa Beach, CA (US); Jongmoo Choi, Gardena, CA (US); Mayukh Sattiraju, Redondo Beach, CA (US); Siddharth Agarwal, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 51 days.

(21) Appl. No.: 17/305,701

(22) Filed: Jul. 13, 2021

(65) Prior Publication Data

US 2023/0015357 A1    Jan. 19, 2023

(51) Int. Cl.
*G06V 20/58*      (2022.01)
*G06V 10/75*      (2022.01)
*G06V 20/56*      (2022.01)

(52) U.S. Cl.
CPC ............ *G06V 20/58* (2022.01); *G06V 10/751* (2022.01); *G06V 20/588* (2022.01)

(58) Field of Classification Search
CPC ............................ G06V 10/751; G06V 20/588
See application file for complete search history.

(56) References Cited

U.S. PATENT DOCUMENTS

| | | | |
|---|---|---|---|
| 6,675,094 B2 | 1/2004 | Russell et al. | |
| 9,352,778 B2 | 5/2016 | Yoon et al. | |
| 9,595,197 B2* | 3/2017 | Lee | G08G 1/167 |
| 10,227,039 B1 | 3/2019 | Prasad | |
| 11,104,336 B2 | 8/2021 | Lin et al. | |
| 11,237,562 B2 | 2/2022 | Schultz et al. | |
| 11,260,757 B2 | 3/2022 | Degand et al. | |
| 11,328,593 B2 | 5/2022 | Urano et al. | |

(Continued)

FOREIGN PATENT DOCUMENTS

| | | |
|---|---|---|
| CN | 109740469 A | 5/2019 |
| CN | 111344646 A | 6/2020 |

(Continued)

OTHER PUBLICATIONS

Bouhoute, Afaf, et al., "On the Application of Machine Learning for Cut-in Maneuver Recognition in Platooning Scenarios", 2020 IEEE 91st Vehicular Technology Conference (VTC2020—Spring), 2020, 5 pages.

(Continued)

*Primary Examiner* — Md K Talukder

(57) ABSTRACT

An apparatus includes at least one camera configured to capture a series of image frames for traffic lanes in front of an ego vehicle, where each of the series of image frames is captured at a different one of a plurality of times. A target object detection and tracking controller is configured to process each of the image frames using pixel measurements extracted from the respective image frame to determine, from the pixel measurements, a predicted time to line crossing for a target vehicle detected in the respective image frame at a time corresponding to capture of the respective image frame.

20 Claims, 7 Drawing Sheets

(56) References Cited

U.S. PATENT DOCUMENTS

| | | | |
|---|---|---|---|
| 11,535,274 B2 | 12/2022 | Dingli et al. | |
| 2003/0229438 A1 | 12/2003 | Hac | |
| 2004/0164851 A1* | 8/2004 | Crawshaw | B60Q 9/008 |
| | | | 340/435 |
| 2008/0071451 A1 | 3/2008 | Yamaguchi et al. | |
| 2009/0021358 A1 | 1/2009 | Lee et al. | |
| 2009/0030613 A1* | 1/2009 | Kataoka | G06V 20/588 |
| | | | 701/300 |
| 2009/0037062 A1 | 2/2009 | Lee et al. | |
| 2009/0157263 A1 | 6/2009 | Shin | |
| 2009/0284360 A1 | 11/2009 | Litkouhi | |
| 2010/0172542 A1* | 7/2010 | Stein | G08G 1/0967 |
| | | | 348/148 |
| 2010/0182139 A1 | 7/2010 | Chen et al. | |
| 2012/0022739 A1 | 1/2012 | Zeng | |
| 2012/0050074 A1 | 3/2012 | Bechtel et al. | |
| 2013/0190982 A1 | 7/2013 | Nakano et al. | |
| 2013/0190985 A1 | 7/2013 | Nakano et al. | |
| 2013/0261898 A1 | 10/2013 | Fujita et al. | |
| 2013/0321172 A1 | 12/2013 | Igarashi et al. | |
| 2013/0335213 A1* | 12/2013 | Sherony | G08G 1/167 |
| | | | 340/439 |
| 2013/0345900 A1 | 12/2013 | Usui | |
| 2014/0002655 A1 | 1/2014 | Woo et al. | |
| 2014/0236428 A1 | 8/2014 | Akiyama | |
| 2015/0149037 A1 | 5/2015 | Lim et al. | |
| 2015/0314783 A1 | 11/2015 | Nespolo et al. | |
| 2017/0010618 A1* | 1/2017 | Shashua | G01C 21/3841 |
| 2017/0313253 A1 | 11/2017 | Hughes et al. | |
| 2018/0024238 A1 | 1/2018 | Khlifi | |
| 2018/0024562 A1* | 1/2018 | Bellaiche | G01S 13/867 |
| | | | 701/26 |
| 2018/0025235 A1* | 1/2018 | Fridman | H04N 7/18 |
| | | | 382/103 |
| 2018/0141528 A1 | 5/2018 | Oh et al. | |
| 2018/0150700 A1 | 5/2018 | Kaneko et al. | |
| 2018/0186378 A1 | 7/2018 | Zhuang et al. | |
| 2018/0237007 A1 | 8/2018 | Adam et al. | |
| 2018/0307236 A1 | 10/2018 | Reed | |
| 2019/0072973 A1 | 3/2019 | Sun et al. | |
| 2019/0202453 A1* | 7/2019 | Farooqi | B60W 50/0098 |
| 2019/0283748 A1 | 9/2019 | Hajika et al. | |
| 2019/0384294 A1* | 12/2019 | Shashua | G06F 16/2379 |
| 2019/0389470 A1* | 12/2019 | Zarringhalam | B62D 6/008 |
| 2020/0079372 A1 | 3/2020 | Hajika | |
| 2020/0272835 A1* | 8/2020 | Cheng | B60W 50/14 |
| 2020/0339079 A1* | 10/2020 | Ohmura | B60W 30/18159 |
| 2020/0377088 A1 | 12/2020 | Fukushige et al. | |
| 2020/0379461 A1 | 12/2020 | Singh et al. | |
| 2021/0171042 A1* | 6/2021 | Hayakawa | G08G 1/167 |
| 2021/0197858 A1 | 7/2021 | Zhang et al. | |
| 2021/0221364 A1 | 7/2021 | Mase et al. | |
| 2021/0229708 A1* | 7/2021 | Kondo | B60W 60/001 |
| 2021/0366144 A1* | 11/2021 | Magistri | G06V 20/56 |
| 2022/0082403 A1* | 3/2022 | Shapira | G01C 21/3848 |
| 2022/0089219 A1 | 3/2022 | Takebayashi et al. | |
| 2022/0097697 A1* | 3/2022 | Wang | B60W 50/14 |
| 2022/0212670 A1* | 7/2022 | Aoki | B60W 30/16 |
| 2022/0266852 A1 | 8/2022 | Khayyer | |
| 2022/0363250 A1 | 11/2022 | Varunjikar et al. | |

FOREIGN PATENT DOCUMENTS

| | | | |
|---|---|---|---|
| CN | 109740469 B | * | 1/2021 |
| DE | 10333670 B4 | | 7/2019 |
| EP | 3342666 A1 | | 7/2018 |
| EP | 3805073 A1 | | 4/2021 |
| GB | 2550256 A | | 11/2017 |
| IN | 202014005110 A | | 8/2020 |
| JP | 2009-020854 A | | 1/2009 |
| JP | 5187171 B2 | | 4/2013 |
| JP | 2018-203173 A | | 12/2018 |
| JP | 2021-503414 A | | 2/2021 |
| WO | 2019099622 A1 | | 5/2019 |

OTHER PUBLICATIONS

Heinemann, Tonja, "Predicting Cut-Ins in Traffic Using a Neural Network", Masters thesis in Systems, Control and Mechatronics, Chalmers University of Technology, Department of Electrical Engineering, Gothenburg, Sweden, 2017, 62 pages.

Bar Hillel, Aharon, et al., "Recent Progress in Road and Lane Detection: A Survey", Machine Vision and Applications, Apr. 2014, 20 pages.

Morris, Brendan, et al., "Lane Change Intent Prediction for Driver Assistance: On-Road Design and Evaluation", 2011 IEEE Intelligent Vehicles Symposium (IV), Baden-Baden, Germany, Jun. 5-9, 2011, 8 pages.

Narote, S.P., et al., "A Review of Recent Advances in Lane Detection and Departure Warning System", Pattern Recognition, vol. 73, Jan. 2018, 50 pages.

Non-final Office Action dated Sep. 29, 2022, in connection with U.S. Appl. No. 17/305,702, 13 pages.

International Search Report and Written Opinion of the International Search Authority dated Sep. 30, 2022, in connection with International Application No. PCT/US2022/037008, 7 pages.

International Search Report and Written Opinion of the International Search Authority dated Nov. 16, 2022, in connection with International Application No. PCT/US2022/037000, 8 pages.

International Search Report and Written Opinion of the International Search Authority dated Nov. 15, 2022, in connection with International Application No. PCT/US2022/037011, 8 pages.

International Search Report and Written Opinion of the International Search Authority dated Nov. 18, 2022, in connection with International Application No. PCT/US2022/037013, 9 pages.

International Search Report and Written Opinion of the International Search Authority dated Nov. 18, 2022, in connection with International Application No. PCT/US2022/037015, 8 pages.

International Search Report and Written Opinion of the International Search Authority dated Nov. 15, 2022, in connection with International Application No. PCT/US2022/037016, 9 pages.

Baek, et al., "Practical Approach for Developing Lateral Motion Control of Autonomous Lane Change System," Applied Sciences 2020, 10, 3143, Apr. 2020, 15 pages.

Lian et al. "Cornering Stiffness and Sideslip Angle Estimation Based on Simplified Lateral Dynamic Models for Four-In-Wheel-Motor-Driven Electric Vehicles with Lateral Tire Force Information," International Journal of Automotive Technology, vol. 16, No. 4, 2015, 15 pages.

Pereira, et al., "Cornering stiffness estimation using Levenberg-Marquardt approach," Inverse Problems in Science and Engineering, vol. 29, 2021—Issue 12, May 2021, 55 pages.

Sierra et al., "Cornering stiffness estimation based on vehicle later dynamics," Vehicle System Dynamics, vol. 44, Supplement, 2006, 15 pages.

Weon, et al., "Lane Departure Detecting with Classification of Roadway Based on Bezier Curve Fitting Using DGPS/GIS," Technical Gazette 28 1(2021), Feb. 2021, 8 pages.

Non-final Office Action dated Mar. 28, 2023, in connection with U.S. Appl. No. 17/305,704, 14 pages.

Non-final Office Action dated Mar. 30, 2023, in connection with U.S. Appl. No. 17/305,706, 12 pages.

Non-final Office Action dated Apr. 25, 2023, in connection with U.S. Appl. No. 17/305,703, 17 pages.

Final Office Action dated Feb. 23, 2023, in connection with U.S. Appl. No. 17/305,702, 10 pages.

Final Office Action dated Sep. 8, 2023, in connection with U.S. Appl. No. 17/305,704, 15 pages.

Notice of Allowance dated Aug. 7, 2023, in connection with U.S. Appl. No. 17/305,706, 6 pages.

Notice of Allowance dated Aug. 3, 2023, in connection with U.S. Appl. No. 17/305,702, 8 pages.

Notice of Allowance dated Oct. 18, 2023, in connection with U.S. Appl. No. 17/305,703, 11 pages.

Notice of Allowance dated Oct. 18, 2023, in connection with U.S. Appl. No. 17/305,705, 11 pages.

(56) References Cited

OTHER PUBLICATIONS

Notice of Allowance dated Jun. 29, 2023, in connection with U.S. Appl. No. 17/305,702, 9 pages.
Non-final Office Action dated Jun. 30, 2023, in connection with U.S. Appl. No. 17/305,705, 12 pages.

* cited by examiner

Key
D maximum distance inside the lane boundary (m)
V rate of departure (m/s)

SYSTEM AND METHOD IN THE PREDICTION OF TARGET VEHICLE BEHAVIOR BASED ON IMAGE FRAME AND NORMALIZATION

CROSS-REFERENCE TO RELATED APPLICATIONS

This application is related to the subject matter of: U.S. patent application Ser. No. 17/305,702, filed Jul. 13, 2021 and entitled SYSTEM AND METHOD IN DATA-DRIVEN VEHICLE DYNAMIC MODELING FOR PATH-PLANNING AND CONTROL; U.S. patent application Ser. No. 17/305,703, filed Jul. 13, 2021 and entitled SYSTEM AND METHODS OF INTEGRATING VEHICLE KINEMATICS AND DYNAMICS FOR LATERAL CONTROL FEATURE AT AUTONOMOUS DRIVING; U.S. patent application Ser. No. 17/305,704, filed Jul. 13, 2021 and entitled SYSTEM AND METHOD IN VEHICLE PATH PREDICTION BASED ON FULL NONLINEAR KINEMATICS; U.S. patent application Ser. No. 17/305,705, filed Jul. 13, 2021 and entitled SYSTEM AND METHOD IN LANE DEPARTURE WARNING WITH FULL NONLINEAR KINEMATICS AND CURVATURE; U.S. patent application Ser. No. 17/305,706, filed Jul. 13, 2021 and entitled SYSTEM AND METHOD FOR LANE DEPARTURE WARNING WITH EGO MOTION AND VISION. The content of the above-identified patent documents is incorporated herein by reference.

TECHNICAL FIELD

This disclosure relates generally to vehicle driver assist or autonomous driving systems. More specifically, this disclosure relates to improving collision avoidance upon entry of another vehicle into the lane ahead during, for example, adaptive cruise control operation.

BACKGROUND

Advanced driving assist system (ADAS) features, which use automated technology to assist the vehicle operator in driving and parking, form a foundation for autonomous driving (AD). Determination of vehicle position information and/or detection of nearby objects enables features such as: collision detection and avoidance for adaptive cruise control (ACC), emergency braking; blind spot detection for collision warning and/or evasive steering; lane detection for lane keeping and/or centering, lane changing, or lane departure warning; and path planning and control. Other ADAS and AD features may also be implemented using the same sensor set(s).

Electric vehicles (EVs) are often capable of higher driving and handling performance relative to conventional vehicles. EV designs can include low centers of gravity, independent steering, and immediate, quick, and smooth acceleration. As a result, ADAS and AD features for EVs can involve different considerations than those for conventional vehicles.

SUMMARY

Prediction, within a vehicle's ADAS or AD features, of traffic lane cut-in by another vehicle is improved in ways suitable to EVs having higher driving and handling performance. In some cases, detection of the other vehicle and prediction of that other vehicle's behavior is based on vision information, without fusion of other sensor data and without conversion to a world frame. Errors due to inaccurate calibration or incorrect geometry assumptions are thus avoided. Pixel measurements from the vision information can be used directly in determining lane width and target vehicle lateral offset. The pixel measurements can be utilized for calculation of both a normalized target vehicle offset and a target vehicle rate of arrival toward the occupied lane. The target vehicle's time to line crossing into the occupied traffic lane is therefore more accurately and more promptly predicted. Path planning has less lag time and unnecessary motion control (evasive steering and/or emergency braking) may be avoided.

In one embodiment, an apparatus includes at least one camera configured to capture a series of image frames for traffic lanes in front of an ego vehicle, where each of the series of image frames is captured at a different one of a plurality of times. A target object detection and tracking controller is configured to process each of the image frames using pixel measurements extracted from the respective image frame to determine, from the pixel measurements, a predicted time to line crossing for a target vehicle detected in the respective image frame at a time corresponding to capture of the respective image frame.

The at least one camera may be positioned and configured to capture images of at least a portion of an ego traffic lane and at least an adjoining portion of an adjacent traffic lane. The target object detection and tracking controller may be configured to process each of the image frames by determining a width in pixels of the ego traffic lane and a lateral offset in pixels of the target vehicle. The target object detection and tracking controller may further be configured to process each of the image frames by determining a ratio $L_n$ of the lateral offset of the target vehicle $L_t$ to the width of the ego traffic lane $L_e$. The target object detection and tracking controller may be configured to process each of the image frames by determining a rate of arrival $R(k)$ of the target vehicle from the ratio $L_n(k)$ at time k and the ratio $L_n(k-1)$ at time k−1. The rate of arrival $R(k)$ may be determined from:

$$R(k) = \frac{L_n(k) - L_n(k-1)}{\Delta t},$$

where $\Delta t$ is a difference between the time k and the time k−1. The target object detection and tracking controller may be configured to process each of the image frames by determining a time to line crossing $TTLC(k)$ for the target vehicle at the time k. The time to line crossing $TTLC(k)$ is determined from:

$$TTLC(k) = \frac{L_n(k)}{R(k)}.$$

The ratio $L_n$ may be a normalized unitless value.

In another embodiment, an electric vehicle including the apparatus forms the ego vehicle and includes an electric motor configured to drive wheels of the electric vehicle. The electric vehicle also includes a chassis supporting axles on which the wheels are mounted, where the wheels are coupled to a steering mechanism configured to receive a steering angle control signal based on the predicted time to line crossing $TTLC(k)$ for the target vehicle from the target object detection and tracking controller. The electric vehicle further includes a brake actuator configured to actuate brakes for one or more of the wheels, where the brake actuator is configured to receive a braking control signal based on the predicted time to line crossing TTLC(k) for the target vehicle from the target object detection and tracking controller.

In still another embodiment, a method includes capturing a series of image frames for traffic lanes in front of an ego vehicle using at least one camera mounted on the ego vehicle, where each of the series of image frames is captured at a different one of a plurality of times. Each of the series of image frames is processed using pixel measurements extracted from the respective image frame to determine, from the pixel measurements, a predicted time to line crossing for a target vehicle detected in the respective image frame at a time corresponding to capture of the respective image frame.

The at least one camera may be positioned and configured to capture images of at least a portion of an ego traffic lane and at least an adjoining portion of an adjacent traffic lane. Processing each image frame in the series of captured image frames may involve one or more of: determining a width in pixels of the ego traffic lane and a lateral offset in pixels of the target vehicle; determining a ratio $L_n$ of the lateral offset of the target vehicle $L_t$ to the width of the ego traffic lane $L_e$; and determining a rate of arrival R(k) of the target vehicle from the ratio $L_n(k)$ at time k and the ratio $L_n(k-1)$ at time k−1. The rate of arrival R(k) may be determined from:

$$R(k) = \frac{L_n(k) - L_n(k-1)}{\Delta t},$$

where Δt is a difference between the time k and the time k−1. Processing each image frame in the series of captured image frames may also involve determining a time to line crossing TTLC(k) for the target vehicle at the time k, where the time to line crossing TTLC(k) is determined from:

$$TTLC(k) = \frac{L_n(k)}{R(k)}.$$

The ratio $L_n$ may be a normalized unitless value. The ego vehicle may be an electric vehicle within which wheels of the electric vehicle are driven with at least one electric motor. A steering angle control signal for the wheels on the electric vehicle may be based on the predicted time to line crossing TTLC(k) for the target vehicle. A braking control signal for brakes on the electric vehicle may be based on the predicted time to line crossing TTLC(k) for the target vehicle.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

The following references provide background for the present disclosure:

[1] Heinemann, Tonja. "Predicting cut-ins in traffic using a neural network." Master's thesis, 2017.

[2] Bouhoute, Afaf, Mohamed Mosbah, Akka Zemmari, and Ismail Berrada. "On the application of machine learning for cut-in maneuver recognition in platooning scenarios." 2020 IEEE 91st Vehicular Technology Conference(VTC2020-Spring), pp. 1-5. IEEE, 2020.

[3] Morris, Brendan, Anup Doshi, and Mohan Trivedi. "Lane change intent prediction for driver assistance: On-road design and evaluation." 2011 IEEE Intelligent Vehicles Symposium (IV), pp. 895-901. IEEE, 2011.

The fields of advanced driving assist systems (ADAS) and autonomous driving (AD) often use predictions of target vehicles' behaviors. One important and very useful prediction for safer and more comfortable adaptive cruise control (ACC) is cut-in, cut-out, or cut-through of a target vehicle in the lane of travel in front of the vehicle operating with ACC. Cut-in prediction is especially important due to a potential need for emergency braking.

The information on a world frame (or ego vehicle frame) transformed from a vision image frame is not accurate and is limited for use in predicting the behavior of a target vehicle. Conventional methods predict behaviors in the world frame (either a reference world frame or the ego vehicle frame) after transforming sensor measurements to the world frame. Given a camera detection result (e.g., bounding box, cuboid, or lane marking points) on an input image, the detection result may be converted to the world frame using camera calibration parameters (both intrinsic and extrinsic) and an additional constraint. Due to the nature of the perspective projection, having the additional constraint is essential to recover the three dimensional (3D) location from a two dimensional (2D) measurement. In a driving situation, a planar road structure is assumed to compute the transformation. Hence, both the camera calibration error and the planar structure assumption affect the localization error of the transformed data.

Figure 1:
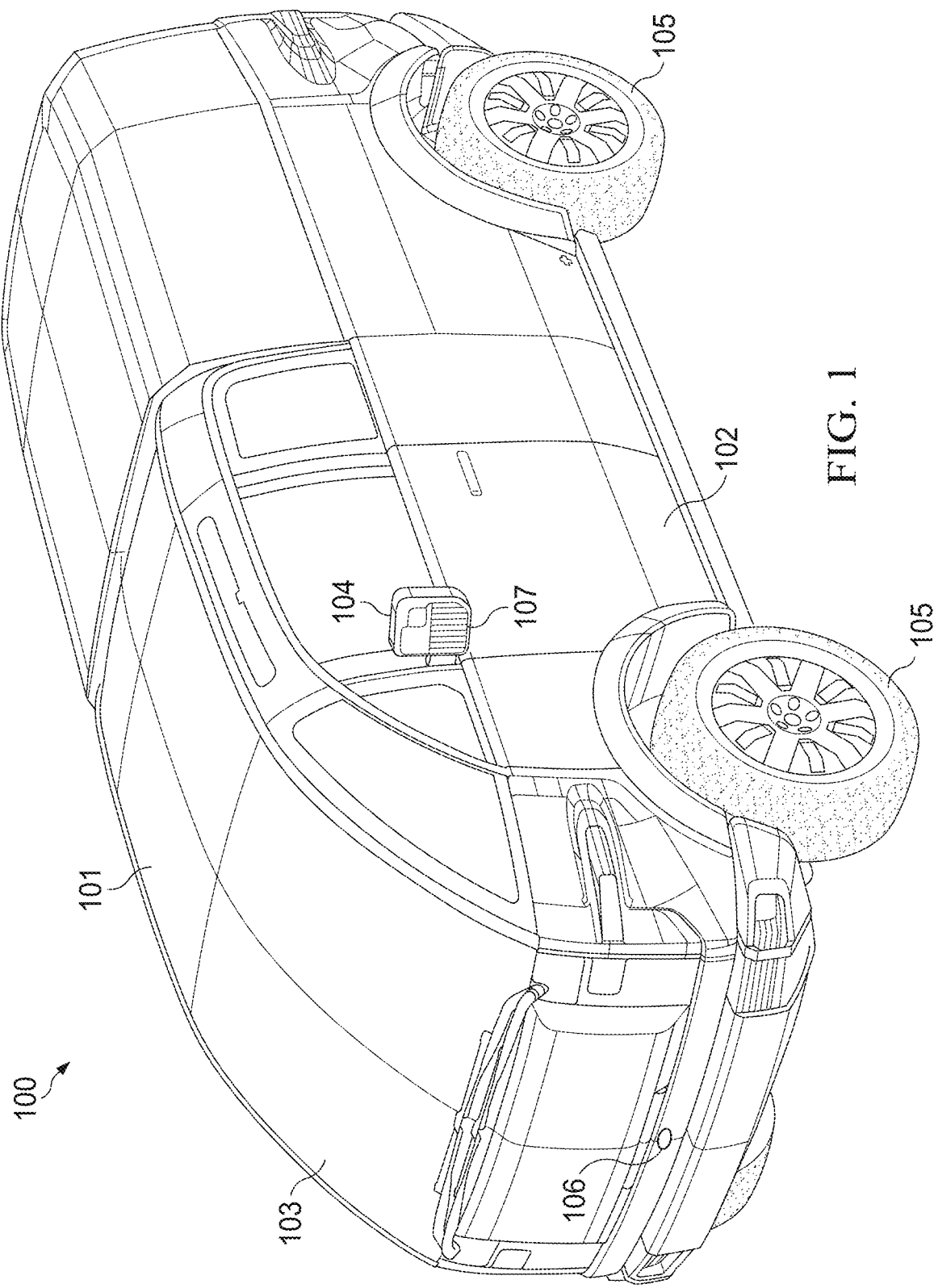
FIG. 1 is a perspective view of a vehicle within which improved target vehicle detection during lane cut-in is implemented in accordance with embodiments of the present disclosure.

FIG. 1 is a perspective view of a vehicle 100 within which improved target vehicle detection during lane cut-in is implemented in accordance with embodiments of the present disclosure. The embodiment of the vehicle 100 illustrated in FIG. 1 is for illustration and explanation only. FIG. 1 does not limit the scope of this disclosure to any particular implementation of a vehicle.

The vehicle 100 of FIG. 1 includes a chassis (not visible in FIG. 1) supporting a cabin 101 for carrying passengers. In some embodiments, the vehicle 100 is an EV in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle described in further detail below. In other embodiments, the vehicle 100 is a combustion engine vehicle.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an AD mode) to see outside the cabin 101. Rear view mirrors 104 mounted to sides of the cabin 101 enable the operator to see objects to the sides and rear of the cabin 101 and may include warning indicators (e.g., selectively illuminated warning lights) for ADAS features such as blind spot warning (indicating that another vehicle is in the operator's blind spot) and/or lane departure warning.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

In the present disclosure, the vehicle 100 includes a vision system including at least a front camera 106, side cameras 107 (mounted on the bottoms of the rear view mirrors 104 in the example depicted), and a rear camera. The cameras 106, 107 provide images to the vehicle control system for use as part of ADAS and AD features as described below, and the images may optionally be displayed to the operator.

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1, and the improved target vehicle detection during lane cut-in described in this disclosure may be used with any other suitable vehicle.

Figure 2:
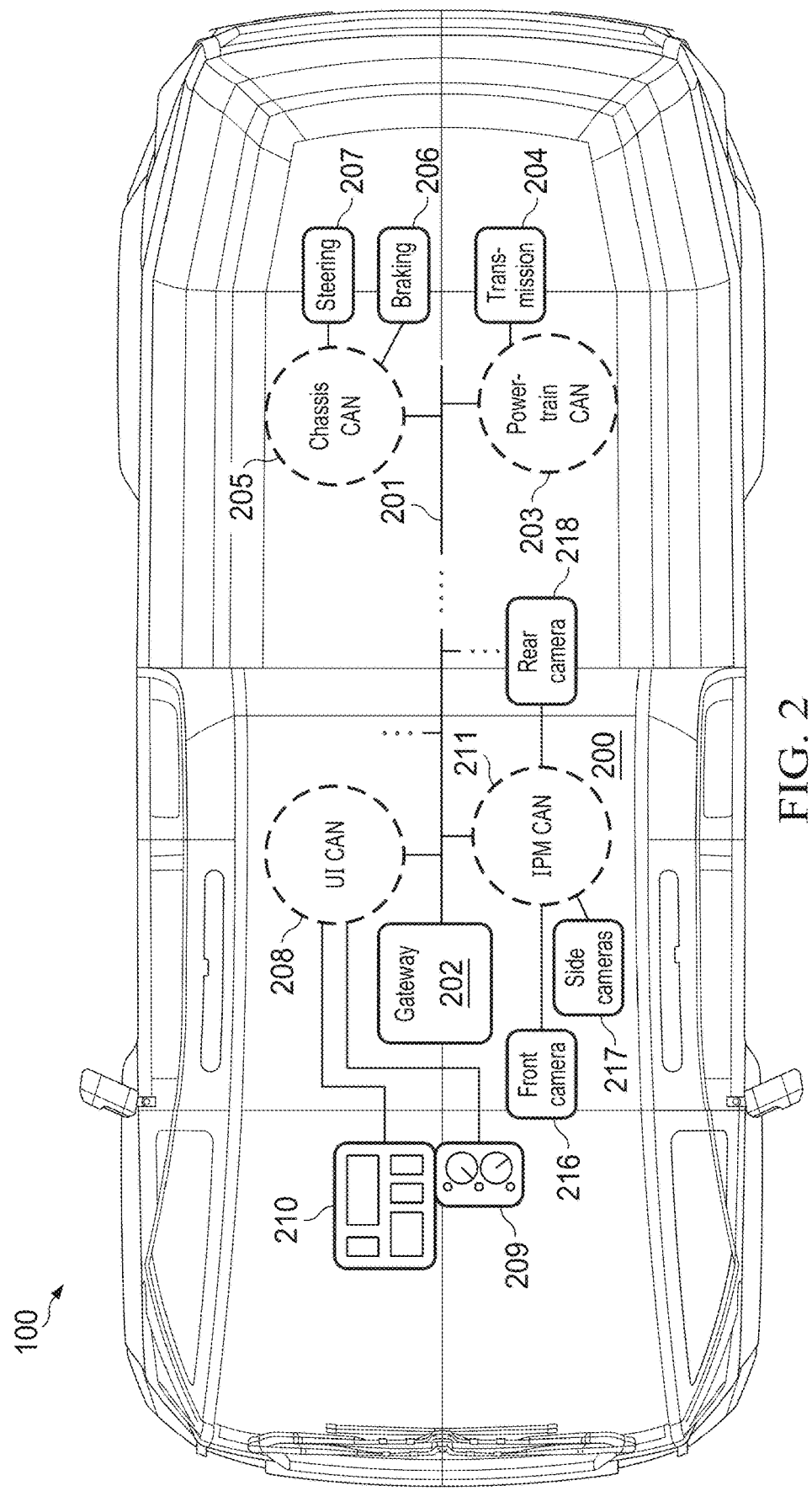
FIGS. 2 and 2A depict a vehicle control system for a vehicle within which improved target vehicle detection during lane cut-in is implemented in accordance with embodiments of the present disclosure.
Figure 2A:
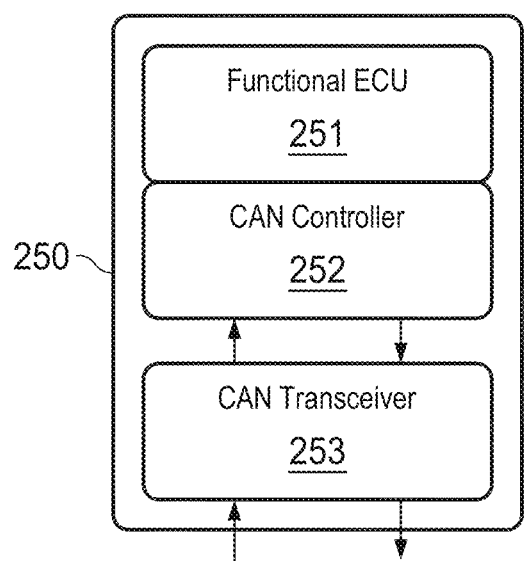

FIGS. 2 and 2A depict a vehicle control system 200 for a vehicle within which improved target vehicle detection during lane cut-in is implemented in accordance with embodiments of the present disclosure. The embodiment of the vehicle control system 200 illustrated in FIGS. 2 and 2A is for illustration and explanation only. FIGS. 2 and 2A do not limit the scope of this disclosure to any particular implementation of a vehicle control system.

FIG. 2 depicts a modern vehicle control system 200 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 2). Sensors constantly report whether the doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 2, the vehicle control system 200 includes a CAN bus 201 embodied or controlled by a gateway ECU 202, which facilitates messages on and among CANs, transmitted and detected by ECUs. FIG. 2 illustrates a powertrain CAN 203 to which a transmission ECU 204 is connected and a chassis CAN 205 to which a braking ECU 206 and a steering (e.g., steering angle) ECU 207 are connected. The braking ECU 206 is connected to brake actuator(s) (not shown) for emergency and normal braking, while the steering ECU 207 is connected to a steering drive motor for evasive and normal steering. The vehicle control system 200 in FIG. 2 also includes a user interface (UI) CAN 208 to which a "dashboard" ECU 209 and a touchscreen ECU 210 are connected. The ECUs 209 and 201 may be integrated with the respective dashboard controls and touchscreen. The UI CAN 208 and the associated dashboard ECU 209 and touchscreen 210 allow the operator to set operating parameters such as following distance for ACC, enable or disable ADAS indicators such as blind spot detection or collision warning, and the like. The dashboard ECU 209 may be connected to sensors and indicators other than those on the dashboard, such as the rear view mirror blind spot indicators described above. The ADAS indicators may include illuminated indicators on any combination of the dashboard and the rear view mirrors and/or in a heads-up display projected onto the windshield 103; audio warnings sounded on the vehicle's audio system speakers; and/or haptic indicators such as a vibrator within the vehicle operator's seat.

For the present disclosure, the vehicle control system 200 includes an image processing module (IPM) CAN 211 to which the front camera ECU 216, side camera ECU 217, and rear camera ECU 218 are connected. The front camera ECU 216 receives image data from the front camera 106 on the vehicle 100, while the side camera ECU 217 receives image data from each of the side cameras 107 and the rear camera ECU 218 receives image data from the rear camera. In some embodiments, a separate ECU may be used for each camera, such that two side camera ECUs may be employed. The IPM CAN 211 and the front camera ECU 216, side camera ECU 217, and rear camera ECU 218 process image data for use in vision-based ADAS features, such as providing a rear back-up camera display and/or stitching together the images to create a "bird's eye" view of the vehicle's surroundings.

FIG. 2A illustrates a high level block diagram for the architecture 250 of each CAN depicted in FIG. 2. Each CAN shown in FIG. 2, including the IPM CAN 211, includes a functional ECU 251 for the specific function performed by the respective CAN (e.g., image processing in the case of IPM CAN 211). The functional ECU 251 is coupled to a CAN controller 252 that controls the interactions of the respective CAN with the other CANs within the vehicle 100 through the gateway ECU 202. A CAN transceiver 253 receives messages from and transmit messages to other CANs under the control of the CAN controller 252.

Although FIGS. 2 and 2A illustrate one example of a vehicle control system 200, those skilled in the art will recognize that the full structure and operation of a suitable vehicle control system is not depicted in the drawings or described here. Instead, for simplicity and clarity, only the structure and operation necessary for an understanding of the present disclosure is depicted and described. Various changes may be made to the example of FIGS. 2 and 2A, and the improved target vehicle detection during lane cut-in described in this disclosure may be used with any other suitable vehicle control system.

To support various ADAS functions such as collision detection, the IPM CAN 211 for the vehicle 100 detects target vehicles cutting-into (or cutting-out of or cutting through) the traffic lane ahead of the vehicle 100. Some approaches use kinematic models assuming constant speed or changing and constant turn rate, for which the required world frame information such as lateral distance, the target vehicle arrival speed to the ego lines, and time to line crossing, is estimated based on sensor fusion with radar (or lidar) and camera data to provide a warning index about how the target vehicle will cut in the ego lines from the adjacent lane. Approaches based on the transformed information on the world frame are known in the art.

Figure 3:
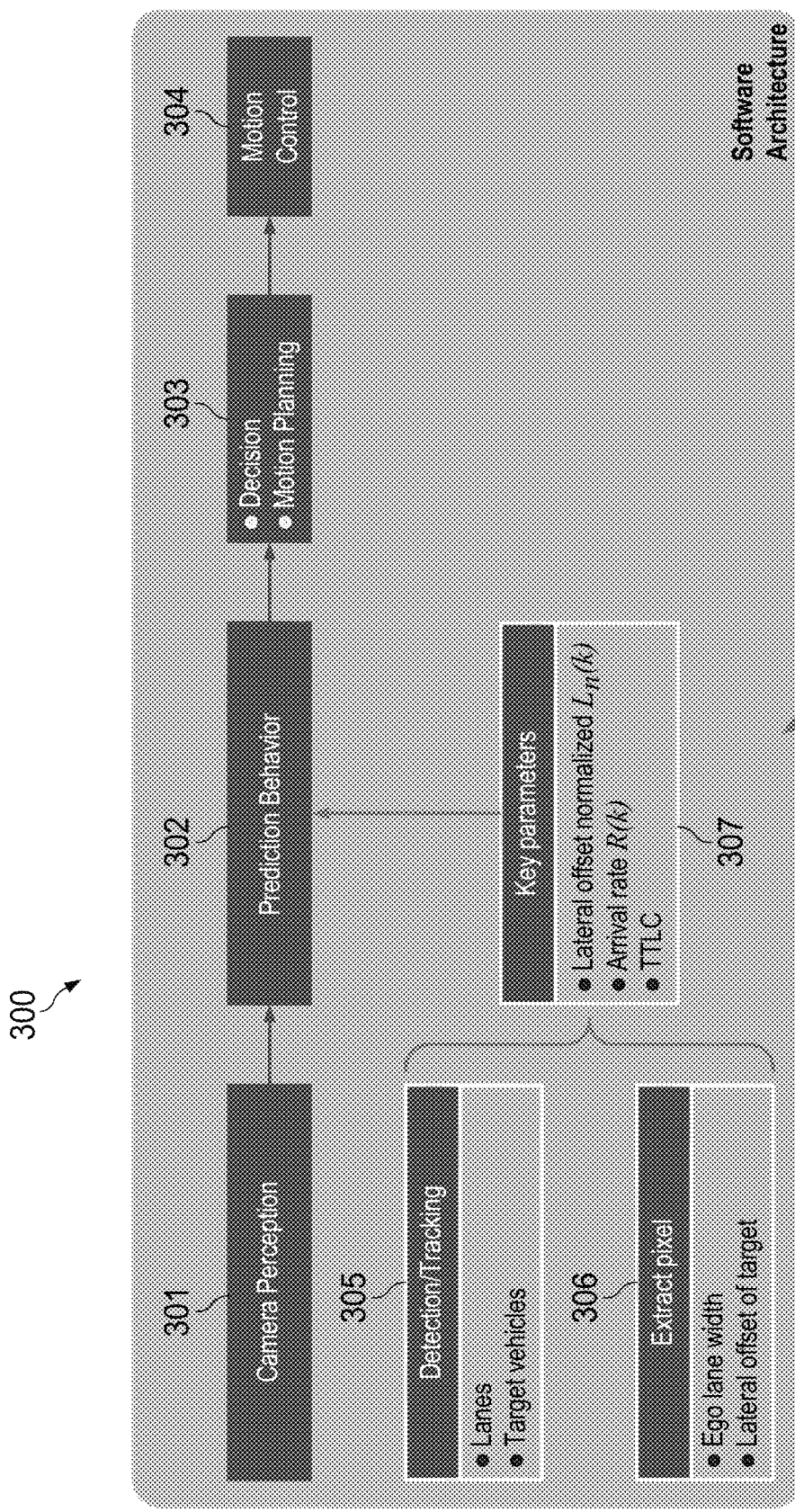
FIG. 3 illustrates a functional diagram of a system within a vehicle for performing improved target vehicle detection during lane cut-in in accordance with embodiments of the present disclosure.

FIG. 3 illustrates a functional diagram of a system 300 within a vehicle for performing improved target vehicle detection during lane cut-in in accordance with embodiments of the present disclosure. The embodiment of the system 300 illustrated in FIG. 3 is for illustration and explanation only. FIG. 3 does not limit the scope of this disclosure to any particular implementation. In some embodiments, the system 300 in FIG. 3 may be implemented using, or by connection to, the front camera 106 and the side cameras 107 in FIG. 1 and the IPM CAN 211, front camera ECU 216, side camera ECU(s) 217, and rear camera ECU 218 in FIG. 2, including the functional (CAN) ECU 251, CAN processor/controller 252, and CAN transceiver 253 for IPM CAN 211 depicted in FIG. 2A. Specific functions depicted in FIG. 3 may be distributed among those components.

To support ADAS and AD features, the system 300 includes the functions of camera perception 301, target vehicle behavior prediction 302, decision and motion planning 303, and motion control 304. Camera perception 301 detects a target vehicle that may cut-in to the lane ahead, while target vehicle behavior prediction 302 determines a likelihood that the target vehicle will cut-in to the lane ahead based on the target vehicle's distance and relative velocity and acceleration. Decision and motion planning 303 and motion control 304 respectively determine and, if necessary, implement reactive responses to cut-in by the target vehicle, such as collision warning, evasive steering, and/or emergency braking.

Camera perception 301 implements at least object detection/tracking 305 and pixel extraction 306 for objects of interest. Object detection/tracking 305 in the example of FIG. 3 includes detecting and tracking traffic lane(s) and target vehicle(s). Pixel extraction 306 is performed for at least ego lane width (where "ego" refers to parameters relating to the vehicle implementing the ADAS and/or AD features, such as the width of the traffic lane occupied by that vehicle for "ego lane width") and lateral offset of the target vehicle(s), in the example shown. The information from detection/tracking 305 and pixel extraction 306 is used to develop several key parameters 307 used by behavior prediction 302, including normalized lateral offset $L_n(k)$ of the target vehicle, arrival rate $R(k)$ of the target vehicle to the occupied lane, and time-to-line-crossing (TTLC) of the target vehicle, crossing the ego lines of the vehicle implementing the ADAS and/or AD features. In some embodiments of the present disclosure, only vision information is used for predicting the behavior of the target vehicle, without any sensor fusion of the vision data with data from radar, lidar, and/or an inertial measurement unit (IMU).

The following information may be directly extracted by pixel extraction 306 from the image frame and expressed in the unit of pixel(s) instead of being transformed to the world frame:

$L_t(k)$: lateral offset of target vehicle in adjacent lanes, which is distance from line to edge of target vehicle; and $L_e(k)$: width of lane corresponding to the location of the ego vehicle.

In the variables used here, k denotes discrete time based on the sampling time of each image frame.

Figure 4:
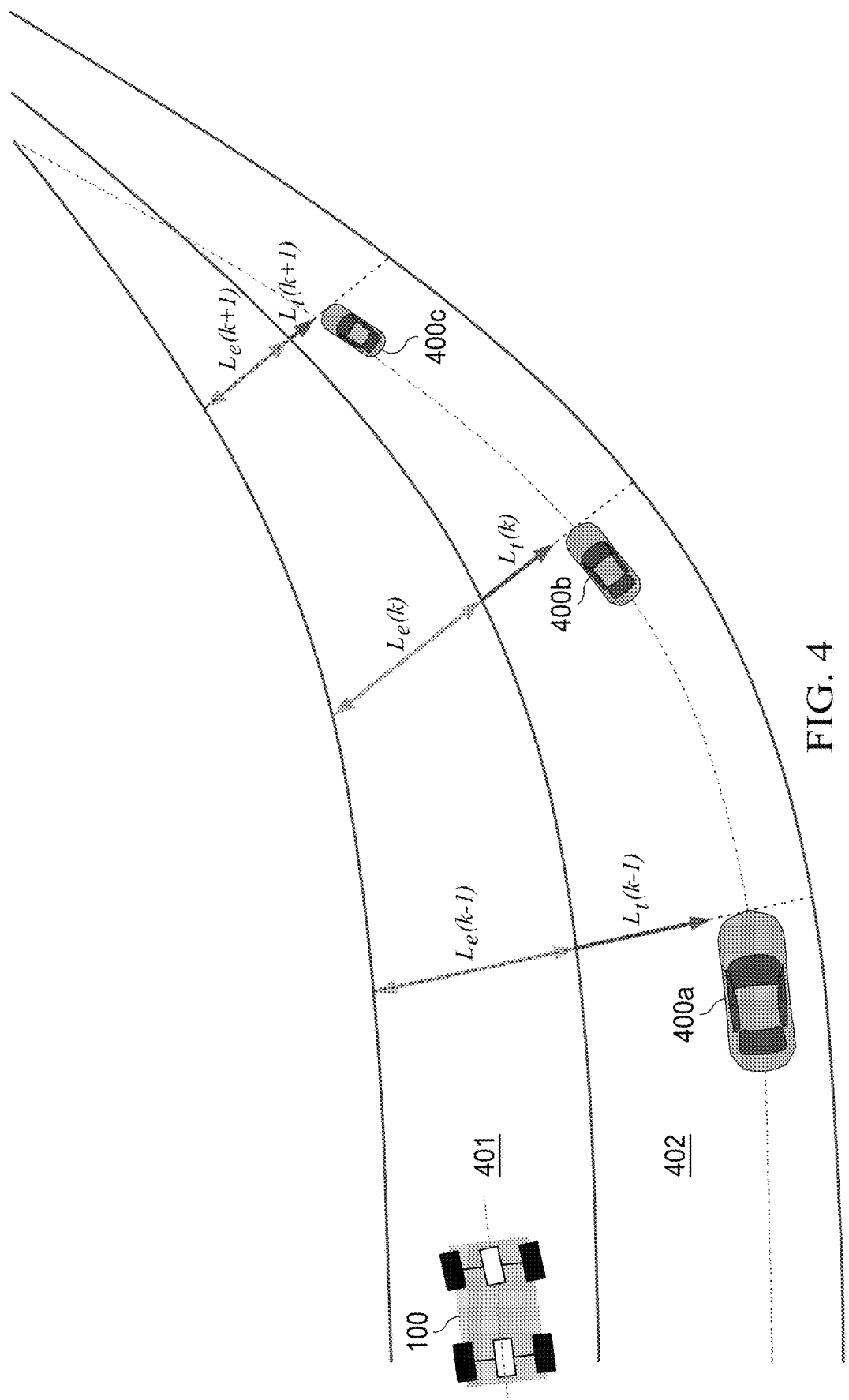
FIG. 4 illustrates physical information represented by parameters, extracted from vision image frames in pixel measurements, used for improved target vehicle detection during lane cut-in in accordance with embodiments of the present disclosure.

FIG. 4 illustrates physical information represented by parameters, extracted from vision image frames in pixel measurements, used for improved target vehicle detection during lane cut-in in accordance with embodiments of the present disclosure. A target vehicle 400 occupies a traffic lane 402 adjacent to a traffic lane 401, which is occupied by the ego vehicle 100. A succession of image frames is taken at each of times k−1, k, and k+1. Target vehicle lateral offsets $L_t(k-1)$, $L_t(k)$, and $L_t(k+1)$ and ego vehicle lane widths $L_e(k-1)$, $L_e(k)$, and $L_e(k+1)$ are determined from the respective images at those time, in measurements in units of pixels. The image frames and corresponding target vehicle lateral offsets and ego vehicle lane widths are processed using extracted pixel information (obtained from pixel extraction 306) for detection and tracking of target vehicle(s) (by detection/tracking 305) based on key parameters 307, in direct calculations using the pixel-based measurements as described in further detail below.

There may be two concerns for the extracted pixel information. First, the transformation of extracted pixel information to the world frame will deteriorate accuracy of that information. Second, a manner of using the pixel information in the image frame without transformation and while retaining accuracy may need to be determined. To handle these two concerns, a normalization method can be used.

With the extracted pixel information from each image frame, three key parameters can be calculated. Firstly, the arrival ratio of the target vehicle can be defined by normalizing the lateral offset pixel of the target vehicle by the ego lane width pixel can be expressed as:

$$0 < L_n(k) = \frac{L_t(k)}{L_e(k)} < 1,$$

Here, $L_n(k)$ is the normalized lateral offset and is non-dimensional but can provide essential information about cut-in behavior of the target vehicle. That is, when $L_n(k)=0$, the target vehicle touches the ego line. As $L_n(k)$ decreases, the target vehicle approaches the ego lane.

Secondly, to represent the approach of the target vehicle, the rate of arrival can be calculated by:

$$R(k) = \left| \frac{L_n(k) - L_n(k-1)}{\Delta t} \right|,$$

which has units of [1/sec] and uses at least two values of $L_n(k)$ (i.e., k≥2) at different times separated by $\Delta t$ (the sampling time interval for processed image frames).

Finally, the time to line crossing (TTLC) of the target vehicle at time k can be expressed as:

$$TTLC(k) = \frac{L_n(k)}{R(k)},$$

which has units of seconds. R(k) may need to be saturated to protect TTLC(k) from becoming undefined when R(k) goes near zero.

Figure 5:
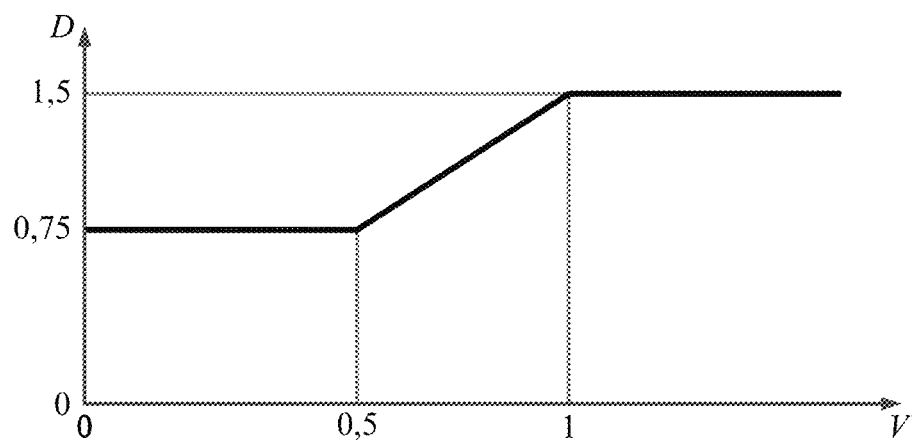
FIG. 5 illustrates a location of an earliest target vehicle cut-in warning line based on ISO 17361:2017.

A target vehicle cut-in prediction can be made by combining the three key parameters ($L_n(k)$, R(k) and TTLC(k)) defined above. One technique is to apply a threshold to TTLC(k). Another technique is to take advantage of the lane departure warning (LDW) defined ISO 17361:2017. FIG. 5 illustrates a location of an earliest target vehicle cut-in warning line based on that standard, using D to represent a maximum distance inside the ego lane boundary m that a target vehicle may travel before TTLC(k)=0 (that is, the target vehicle crossed the ego lane line) and V to represent rate of departure in meters/second (m/s). Both parameters (D and V) from ISO 17361:2017 can be converted from or to the two normalized parameters discussed above as follows:

$$\frac{D}{\text{lane width } (= 3.6 \text{ m})} \approx L_n(k); \text{ and}$$

-continued $$\frac{V}{\text{lane width } (= 3.6 \text{ m})} \approx R(k)$$

The thresholds shown in FIG. 5 can be converted for use in predicting cut-in of the target vehicle according to the present disclosure as follows:

$$1.5[m] ==> \frac{1.5}{3.6} \approx 0.417[-], 0.75[m] ==> \frac{0.75}{3.6} \approx 0.208[-],$$

$$0.5[m/s] ==> \frac{0.5}{3.6} \approx 0.139[1/s], 1.0[m/s] ==> \frac{1.0}{3.6} \approx 0.278[1/s].$$

Using normalized pixel measurements from processed image frames helps to detect and track target objects so that the prediction, planning, and control functions (functions 302-304) can take advantage of target object detection and tracking.

Figure 6:
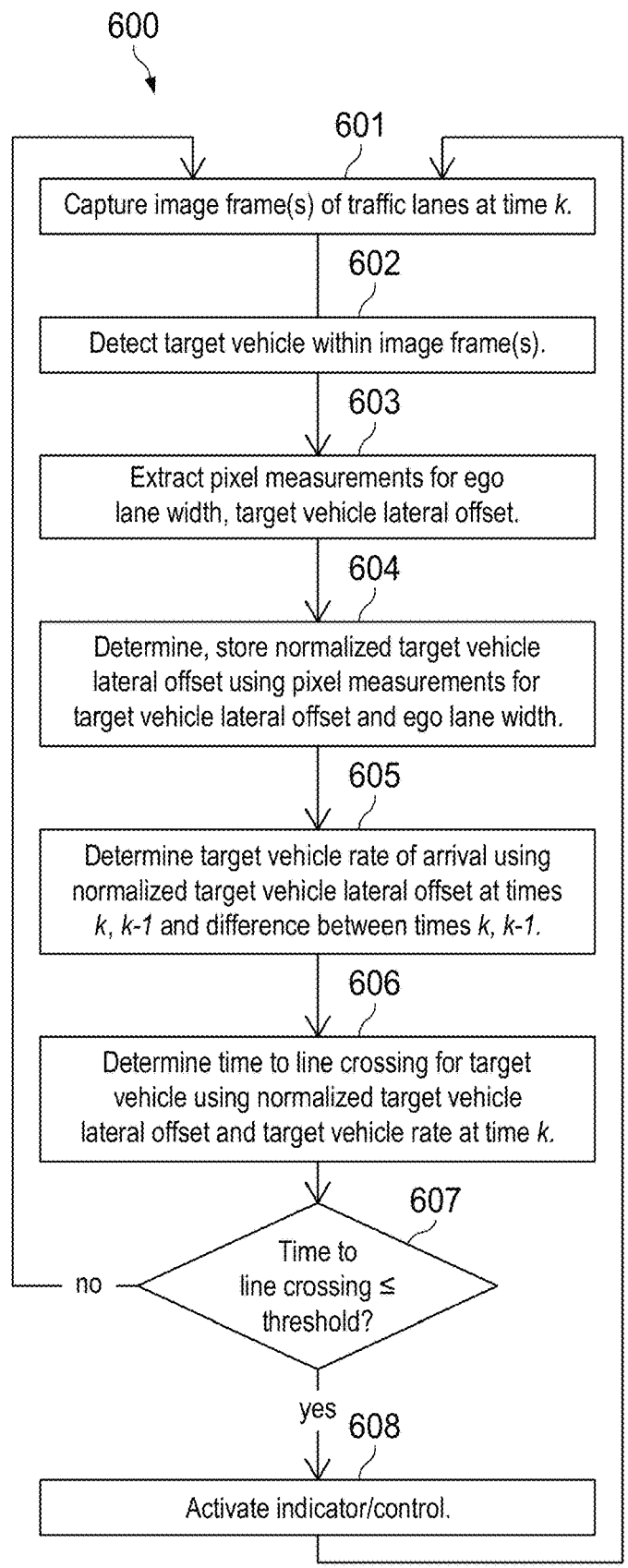
FIG. 6 illustrates a high level flow diagram for a process of improved target vehicle detection during lane cut-in in accordance with embodiments of the present disclosure.

FIG. 6 illustrates a high level flow diagram for a process 600 of improved target vehicle detection during lane cut-in in accordance with embodiments of the present disclosure. The embodiment of the process 600 illustrated in FIG. 6 is for illustration and explanation only. FIG. 6 does not limit the scope of this disclosure to any particular implementation. In some embodiments, the process 600 in FIG. 6 may be implemented using, or by connection to, the front camera 106 and the side cameras 107 in FIG. 1 and the IPM CAN 211, front camera ECU 216, side camera ECU(s) 217, and rear camera ECU 218 in FIG. 2, including the functional (CAN) ECU 251, CAN processor/controller 252, and CAN transceiver 253 for IPM CAN 211 depicted in FIG. 2A. The process 600 may be implemented using the functions depicted in FIG. 3.

The example process 600 illustrated in FIG. 6 includes capturing at least one image frame for traffic lanes in front of an ego vehicle using at least one camera mounted on the ego vehicle at time k (step 601). This may involve capturing images using a front camera and one or both side cameras and "stitching" those images together to form a panoramic field of view encompassing up to 180°. A target vehicle within a lane adjacent to the ego lane is detected within the image (step 602), such as by using any suitable object recognition technique. The image frame is processed, possibly without fusion of other sensor data and without transformation to a world frame, to determine pixel measurements (in units of pixels) for the ego lane width and the target vehicle lateral offset (step 603). A normalized target vehicle lateral offset for time k is determined from the pixel measurements for the target vehicle lateral offset and the ego lane width (step 604), and the normalized target vehicle lateral offset at time k is stored for use as a value at time k−1 during a subsequent iteration of the process.

The normalized target vehicle lateral offset is used to determine a rate of arrival for the target vehicle toward the ego lane (step 605), such as by using the normalized target vehicle lateral offset at each of times k and k−1 and the difference between times k and k−1. A time to line crossing into the ego lane by the target vehicle is determined from the rate of arrival and the normalized target vehicle lateral offset (step 606). The time to line crossing is compared to a predetermined value (step 607) in order to ascertain whether the target vehicle is entering the ego lane. If not, another iteration of the process is started. If so, an indicator and/or a vehicle control is activated as described above (step 608), and another iteration of the process is started.

The present disclosure therefore provides an algorithm that in some embodiments may use vision only, so there is no increment in cost or impediment to manufacturability and assembly. Whereas an approach converting everything to a world frame simplified as a two-dimensional (2D) space may not be accurate due to error sources including insufficiently accurate conversion calibration parameters incorrect geometry assumptions (e.g., planar road), various embodiments of the present disclosure may avoid transformation and work directly in image space.

While the description above often refers to lane cut-in detection, the same or similar approaches described herein may be used for other functions like lane cut-out and lane cut-through detection.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   capturing a series of image frames for traffic lanes in front of an ego vehicle using at least one camera, wherein each of the series of image frames is captured at a different one of a plurality of times, and wherein the traffic lanes include an ego traffic lane occupied by the ego vehicle and an adjacent traffic lane for traffic traveling in a same direction as traffic within the ego traffic lane;
   processing each of the image frames to detect a target vehicle in the adjacent traffic lane within the respective image frame at a time corresponding to capture of the respective image frame;
   determining, using pixel measurements extracted from the image frames, a predicted time to line crossing for the detected target vehicle to cross into the ego traffic lane from the adjacent traffic lane;
   determining a rate of arrival R(k) of the target vehicle from the ratio $L_n(k)$ at time k and the ratio $L_n(k-1)$ at time k−1; and
   controlling the ego vehicle based on the predicted time to line crossing by the target vehicle into the ego traffic lane from the adjacent traffic lane.

2. The method according to claim 1, wherein the rate of arrival R(k) is determined from:

$$R(k) = \frac{L_n(k) - L_n(k-1)}{\Delta t},$$

where $\Delta t$ is a difference between the time k and the time k−1.

3. The method according to claim 1, further comprising:
   determining a time to line crossing TTLC (k) for the target vehicle at the time k.

4. The method according to claim 3, wherein the time to line crossing TTLC (k) is determined from:

$$TTLC(k) = \frac{L_n(k)}{R(k)}.$$

5. An apparatus, comprising:
   at least one camera configured to capture a series of image frames for traffic lanes in front of an ego vehicle, wherein each of the series of image frames is captured at a different one of a plurality of times, and wherein the traffic lanes include an ego traffic lane occupied by the ego vehicle and an adjacent traffic lane for traffic traveling in a same direction as traffic within the ego traffic lane; and
   a target object detection and tracking controller configured to:
   process each of the image frames to detect a target vehicle in the adjacent traffic lane within the respective image frame at a time corresponding to capture of the respective image frame,
   determine, using pixel measurements extracted from the image frames, a predicted time to line crossing for the detected target vehicle to cross into the ego traffic lane from the adjacent traffic lane, and
   control the ego vehicle based on the predicted time to line crossing by the target vehicle into the ego traffic lane from the adjacent traffic lane.

6. The apparatus according to claim 5, wherein the at least one camera is positioned and configured to capture images of at least a portion of the ego traffic lane occupied by the ego vehicle and at least an adjoining portion of the adjacent traffic lane.

7. The apparatus according to claim 5, wherein, to process each of the image frames, the target object detection and tracking controller is configured to determine a width in pixels of an ego traffic lane and a lateral offset in pixels of the target vehicle.

8. The apparatus according to claim 7, wherein, to process each of the image frames, the target object detection and tracking controller is further configured to determine a ratio $L_n$ of the lateral offset of the target vehicle $L_t$ the width of the ego traffic lane $L_e$.

9. The ego vehicle comprising the apparatus according to claim 5, the ego vehicle further comprising:
   a motor configured to drive wheels of the ego vehicle;
   a chassis supporting axles on which the wheels are mounted, the wheels coupled to a steering mechanism configured to receive a steering angle control signal based on the predicted time to line crossing TTLC (k) for the target vehicle from the target object detection and tracking controller; and
   a brake actuator configured to actuate brakes for one or more of the wheels, the brake actuator configured to receive a braking control signal based on the predicted time to line crossing TTLC (k) for the target vehicle from the target object detection and tracking controller.

10. The ego vehicle according to claim 9, wherein the ego vehicle is an electric vehicle and the motor is an electric motor.

11. An apparatus, comprising:
   at least one camera configured to capture a series of image frames for traffic lanes in front of an ego vehicle, wherein each of the series of image frames is captured at a different one of a plurality of times; and
   a target object detection and tracking controller configured to:
      process each of the image frames using pixel measurements extracted from the respective image frame to determine, from the pixel measurements, a predicted time to line crossing for a target vehicle detected in the respective image frame at a time corresponding to capture of the respective image frame, wherein, to process each of the image frames, the target object detection and tracking controller is further configured to
      determine a width in pixels of an ego traffic lane and a lateral offset in pixels of the target vehicle,
      determine a ratio $L_n$ of the lateral offset of the target vehicle $L_t$ the width of the ego traffic lane $L_e$, and
      determine a rate of arrival R(k) of the target vehicle from the ratio $L_n$(k) at time k and the ratio $L_n$(k−1) at time k−1, and control the ego vehicle based on the predicted time to line crossing.

12. The apparatus according to claim 11, wherein the rate of arrival R(k) is determined from:

$$R(k) = \frac{L_n(k) - L_n(k-1)}{\Delta t},$$

where $\Delta t$ is a difference between the time k and the time k−1.

13. The apparatus according to claim 11, wherein, to process each of the image frames, the target object detection and tracking controller is further configured to determine a time to line crossing TTLC(k) for the target vehicle at the time k.

14. The apparatus according to claim 13, wherein the time to line crossing TTLC(k) is determined from:

$$TTLC(k) = \frac{L_n(k)}{R(k)}.$$

15. A method, comprising:
   capturing a series of image frames for traffic lanes in front of an ego vehicle using at least one camera, wherein each of the series of image frames is captured at a different one of a plurality of times, and wherein the traffic lanes include an ego traffic lane occupied by the ego vehicle and an adjacent traffic lane for traffic traveling in a same direction as traffic within the ego traffic lane;
   processing each of the image frames to detect a target vehicle in the adjacent traffic lane within the respective image frame at a time corresponding to capture of the respective image frame;
   determining, using pixel measurements extracted from the image frames, a predicted time to line crossing for the detected target vehicle to cross into the ego traffic lane from the adjacent traffic lane; and
   controlling the ego vehicle based on the predicted time to line crossing by the target vehicle into the ego traffic lane from the adjacent traffic lane.

16. The method according to claim 15, further comprising:
   capturing images of at least a portion of the ego traffic lane occupied by the ego vehicle and at least an adjoining portion of the adjacent traffic lane.

17. The method according to claim 15, further comprising:
   determining a width in pixels of an ego traffic lane and a lateral offset in pixels of the target vehicle.

18. The method according to claim 17, further comprising:
   determining a ratio $L_n$ of the lateral offset of the target vehicle $L_t$ the width of the ego traffic lane $L_e$.

19. The method according to claim 15, further comprising:
   driving wheels of the ego vehicle with a motor;
   supporting axles on which the wheels are mounted with a chassis, the wheels coupled to a steering mechanism configured to receive a steering angle control signal based on the predicted time to line crossing TTLC(k) for the target vehicle; and
   actuating brakes for one or more of the wheels based on the predicted time to line crossing TTLC (k) for the target vehicle.

20. The method according to claim 19, wherein the ego vehicle is an electric vehicle and the motor is an electric motor.

* * * * *